(12) United States Patent
Senoo et al.

(10) Patent No.: US 11,225,117 B2
(45) Date of Patent: Jan. 18, 2022

(54) SUSPENSION DEVICE

(71) Applicant: ISUZU MOTORS LIMITED, Tokyo (JP)

(72) Inventors: Daisuke Senoo, Fujisawa (JP); Atsushi Itou, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/770,505

(22) PCT Filed: Dec. 6, 2018

(86) PCT No.: PCT/JP2018/044872
§ 371 (c)(1),
(2) Date: Jun. 5, 2020

(87) PCT Pub. No.: WO2019/111991
PCT Pub. Date: Jun. 13, 2019

(65) Prior Publication Data
US 2021/0162824 A1 Jun. 3, 2021

(30) Foreign Application Priority Data
Dec. 8, 2017 (JP) .............................. JP2017-236358

(51) Int. Cl.
*B60G 7/02* (2006.01)
*B60G 3/20* (2006.01)
*B60G 7/00* (2006.01)

(52) U.S. Cl.
CPC ............... *B60G 3/20* (2013.01); *B60G 7/001* (2013.01); *B60G 7/02* (2013.01);
(Continued)

(58) Field of Classification Search
CPC . B60G 3/20; B60G 7/001; B60G 7/02; B60G 2200/18; B60G 2204/148;
(Continued)

(56) References Cited

U.S. PATENT DOCUMENTS 1,976,409 A * 10/1934 Nutt .................... B60G 3/26
280/124.127
2,018,653 A * 10/1935 Franko .................. B62D 7/00
280/124.146
(Continued)

FOREIGN PATENT DOCUMENTS

| JP | S61044305 A | 3/1986 |
|---|---|---|
| JP | 05193521 A | 8/1993 |

(Continued)

OTHER PUBLICATIONS

International Search Report and Written Opinion for related PCT App No. PCT/JP2018/044872 dated Jan. 15, 2019, 9 pgs (partial translation).

*Primary Examiner* — Paul N Dickson
*Assistant Examiner* — Timothy Wilhelm
(74) *Attorney, Agent, or Firm* — Procopio, Cory, Hargreaves & Savitch LLP

(57) ABSTRACT

A suspension device according to the present disclosure which is equipped with an upper arm, a lower arm, and a leaf spring, wherein: the intermediate section of the leaf spring is housed inside a main cross member among the suspension cross members; the main cross member among the suspension cross members is connected to the side member via a hollow bracket; the hollow bracket has a bracket shock absorber positioned so as to face the lower arm; and the hollow bracket has a reinforcing part which faces the bracket shock absorber.

4 Claims, 7 Drawing Sheets

(52) U.S. Cl.
CPC .... *B60G 2200/144* (2013.01); *B60G 2200/18* (2013.01); *B60G 2204/143* (2013.01); *B60G 2204/148* (2013.01); *B60G 2204/43* (2013.01)

(58) Field of Classification Search
CPC .......... B60G 2204/144; B60G 2204/43; B60G 2204/121; B62D 21/11
See application file for complete search history.

(56) References Cited

U.S. PATENT DOCUMENTS

| | | | | |
|---|---|---|---|---|
| 2,866,651 | A * | 12/1958 | Powell | B60G 3/26 280/124.141 |
| 2,968,358 | A * | 1/1961 | De Lorean | B60G 3/24 180/358 |
| 3,257,123 | A * | 6/1966 | Giovinazzo | B60G 11/36 280/124.141 |
| 4,159,125 | A * | 6/1979 | Buchwald | B60G 3/06 180/253 |
| 4,377,298 | A * | 3/1983 | Finn | B60G 3/265 180/256 |
| 4,458,918 | A * | 7/1984 | Rumpel | B60G 3/202 267/262 |
| 4,619,466 | A * | 10/1986 | Schaible | B60G 11/08 267/273 |
| 4,813,704 | A * | 3/1989 | Smith | B60G 3/265 280/124.109 |
| 4,887,841 | A * | 12/1989 | Cowburn | B60G 11/08 280/124.109 |
| 5,222,758 | A * | 6/1993 | Sakai | B60G 3/20 280/124.1 |
| 5,248,011 | A * | 9/1993 | Richards | B60G 3/01 180/215 |
| 5,348,334 | A * | 9/1994 | Giltinan | B60G 3/20 280/124.138 |
| 5,456,517 | A * | 10/1995 | Kalian | B60G 15/068 164/47 |
| 5,536,035 | A * | 7/1996 | Bautz | B60G 3/20 280/124.139 |
| 5,782,484 | A * | 7/1998 | Kuhn, Jr. | B60G 3/265 267/248 |
| 5,826,896 | A * | 10/1998 | Baumann | B60G 11/08 280/124.171 |
| 5,833,026 | A * | 11/1998 | Zetterstrom | B60G 3/202 180/360 |
| 6,029,987 | A * | 2/2000 | Hoffman | B60G 11/10 267/260 |
| 6,079,512 | A * | 6/2000 | Krisher | B60G 7/008 180/254 |
| 6,349,953 | B1 * | 2/2002 | Yoshihira | B60G 7/02 280/124.109 |
| 6,378,881 | B2 * | 4/2002 | Stenvall | B60G 3/06 280/124.171 |
| 6,398,262 | B1 * | 6/2002 | Ziech | B60G 3/20 180/311 |
| 6,457,729 | B2 * | 10/2002 | Stenvall | B60G 3/06 280/124.134 |
| 6,547,281 | B1 * | 4/2003 | Iwatsuki | B60G 11/16 280/781 |
| 6,588,779 | B2 * | 7/2003 | Sandahi | B60G 3/20 280/124.135 |
| 6,685,202 | B2 * | 2/2004 | Fujimoto | B62D 21/11 180/311 |
| 6,733,021 | B1 * | 5/2004 | Ziech | B60G 3/18 180/311 |
| 6,752,409 | B1 * | 6/2004 | Kunert | B60G 3/20 280/124.135 |
| 6,764,085 | B1 * | 7/2004 | Anderson | B60G 7/00 280/124.134 |
| 6,832,773 | B2 * | 12/2004 | Yokoyama | B60G 11/08 280/124.171 |
| 6,863,290 | B2 * | 3/2005 | Yokoyama | B60G 3/20 280/124.171 |
| 6,866,295 | B2 * | 3/2005 | Ziech | B60G 7/02 180/312 |
| 6,877,754 | B2 * | 4/2005 | Kim | B62D 21/11 280/124.109 |
| 7,537,223 | B2 * | 5/2009 | Zetterstroem | B60G 3/265 280/5.52 |
| 7,762,568 | B2 * | 7/2010 | Tatsumi | B62D 25/088 280/124.137 |
| 7,819,411 | B2 * | 10/2010 | Eshelman | B60G 7/00 280/124.135 |
| 7,971,890 | B2 * | 7/2011 | Richardson | B60G 11/04 280/124.163 |
| 8,083,243 | B2 * | 12/2011 | Hamada | B60G 7/02 280/124.1 |
| 8,141,904 | B2 * | 3/2012 | Akaki | B62D 21/09 280/784 |
| 8,444,160 | B2 * | 5/2013 | Okamoto | B60G 3/20 280/124.135 |
| 8,485,543 | B2 * | 7/2013 | Richardson | B60G 11/465 280/124.171 |
| 8,579,308 | B2 * | 11/2013 | Weeks | B60G 3/20 280/124.109 |
| 8,596,648 | B2 * | 12/2013 | Venton-Walters | F04B 45/04 280/6.157 |
| 8,857,836 | B2 * | 10/2014 | Okuyama | B60G 7/02 280/124.109 |
| 8,899,602 | B2 * | 12/2014 | Takanashi | B60G 99/00 280/124.134 |
| 8,973,980 | B2 * | 3/2015 | Mildner | B62D 29/041 296/193.09 |
| 9,096,276 | B2 * | 8/2015 | Komiya | B62D 21/155 |
| 9,168,819 | B2 * | 10/2015 | Suzuki | B60K 6/40 |
| 9,266,563 | B1 * | 2/2016 | Han | B62D 21/11 |
| 9,434,417 | B2 * | 9/2016 | Imanishi | B22C 9/10 |
| 9,475,357 | B1 * | 10/2016 | Hinz | B60G 11/28 |
| 9,550,402 | B2 * | 1/2017 | Hinz | B60G 11/27 |
| 9,676,240 | B2 * | 6/2017 | Hinz | F16D 65/183 |
| 9,855,975 | B2 * | 1/2018 | Amemiya | B62D 21/00 |
| 10,232,887 | B2 * | 3/2019 | Maruyama | B62D 25/088 |
| 10,435,075 | B2 * | 10/2019 | Lorenz | B60G 7/008 |
| 10,569,814 | B2 * | 2/2020 | Hulstein | B62D 33/077 |
| 10,661,624 | B2 * | 5/2020 | Andou | B60G 21/026 |
| 10,730,558 | B2 * | 8/2020 | Yamauchi | B62D 25/081 |
| 10,906,596 | B2 * | 2/2021 | Eck | B62D 29/046 |
| 10,913,321 | B2 * | 2/2021 | Lorenz | B60G 11/27 |
| 10,974,558 | B2 * | 4/2021 | Rochell | B60G 11/10 |
| 2001/0042967 | A1 * | 11/2001 | Stenvall | B60G 3/06 280/124.163 |
| 2004/0051262 | A1 * | 3/2004 | Young | B62K 5/00 280/7.12 |
| 2005/0247502 | A1 * | 11/2005 | Ziech | B62D 7/18 180/253 |
| 2006/0208447 | A1 * | 9/2006 | Eshelman | B60G 11/28 280/124.135 |
| 2006/0261570 | A1 * | 11/2006 | Eshelman | B60G 11/16 280/124.134 |
| 2007/0131474 | A1 * | 6/2007 | Zetterstroem | B62D 17/00 180/411 |
| 2008/0290623 | A1 * | 11/2008 | Lundmark | B60G 21/026 280/124.152 |
| 2008/0315546 | A1 * | 12/2008 | Kucinski | B60G 11/16 280/124.108 |
| 2010/0187800 | A1 * | 7/2010 | Chen | B62D 23/005 280/785 |
| 2011/0079978 | A1 * | 4/2011 | Schreiner | F41H 7/04 280/124.1 |
| 2013/0113177 | A1 * | 5/2013 | Seethaler | B60G 3/06 280/124.145 |
| 2015/0084375 | A1 * | 3/2015 | Asano | B62D 25/088 296/187.09 |
| 2016/0159399 | A1 * | 6/2016 | Yasuhara | B62D 25/085 180/292 |
| 2016/0244103 | A1 * | 8/2016 | Amemiya | B62D 21/00 |
| 2017/0320522 | A1 * | 11/2017 | Lorenz | B60G 3/18 |
| 2018/0272818 | A1 * | 9/2018 | Johnson | B60G 11/27 |

(56) References Cited

U.S. PATENT DOCUMENTS

2020/0307331 A1\* 10/2020 Senoo .................... B60G 11/08
2020/0369107 A1\* 11/2020 Senoo ..................... B60G 7/02

FOREIGN PATENT DOCUMENTS

| JP | H07112607 A | 5/1995 |
|----|-------------|--------|
| JP | H09099721 A | 4/1997 |

\* cited by examiner

[Fig. 1]
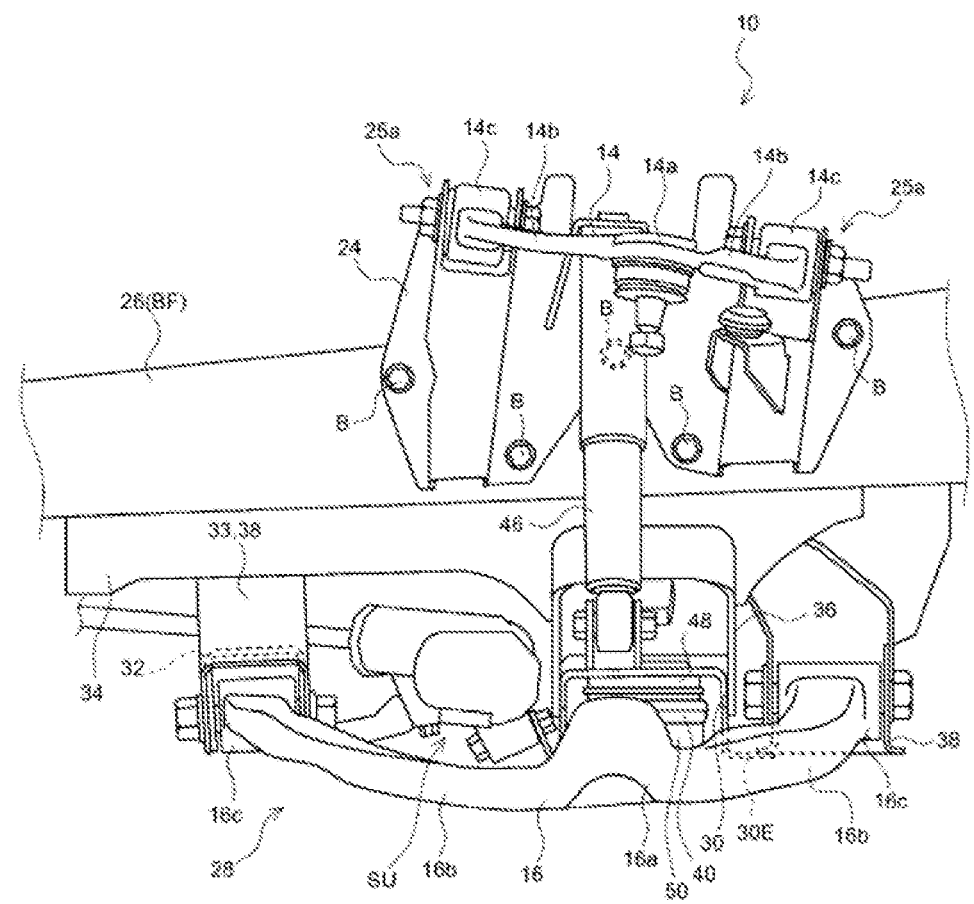

[Fig. 2]
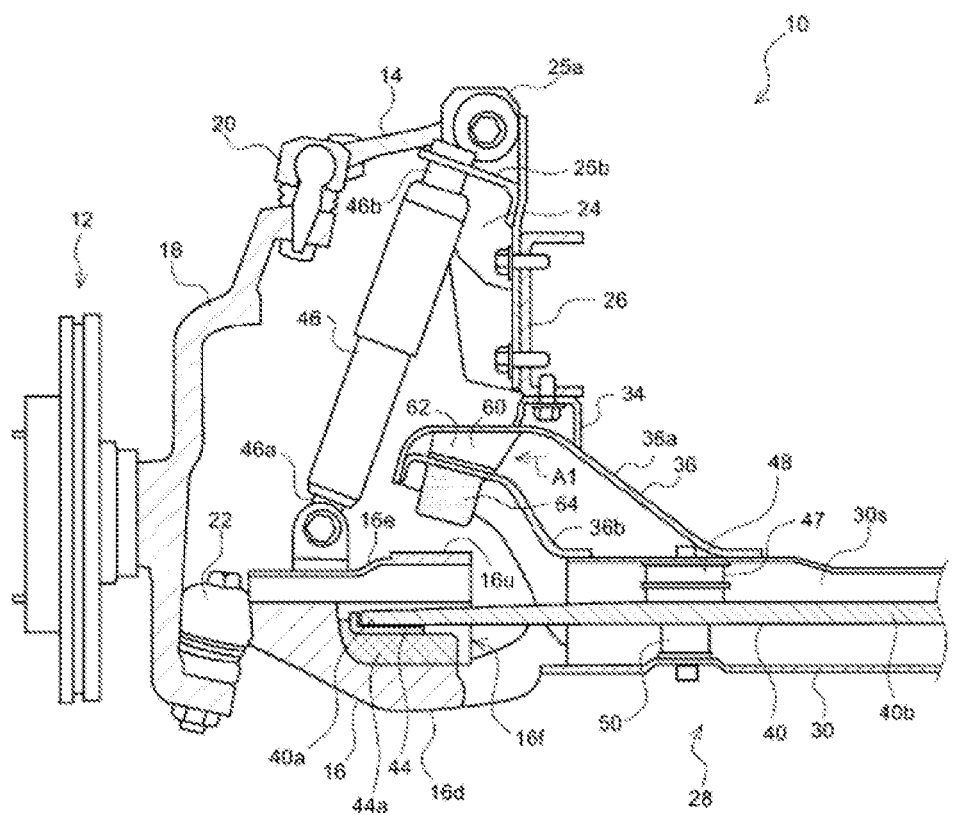

[Fig. 3]
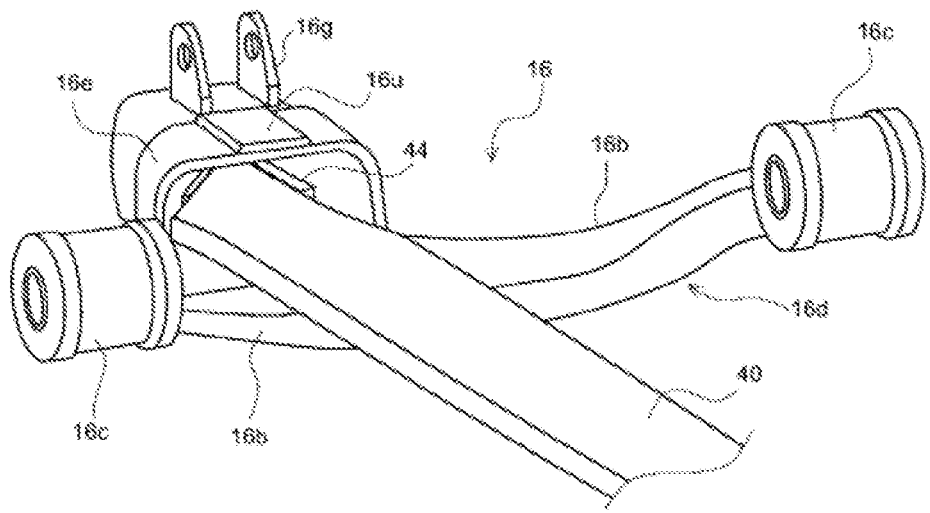

[Fig. 4]
BACKGROUND ART
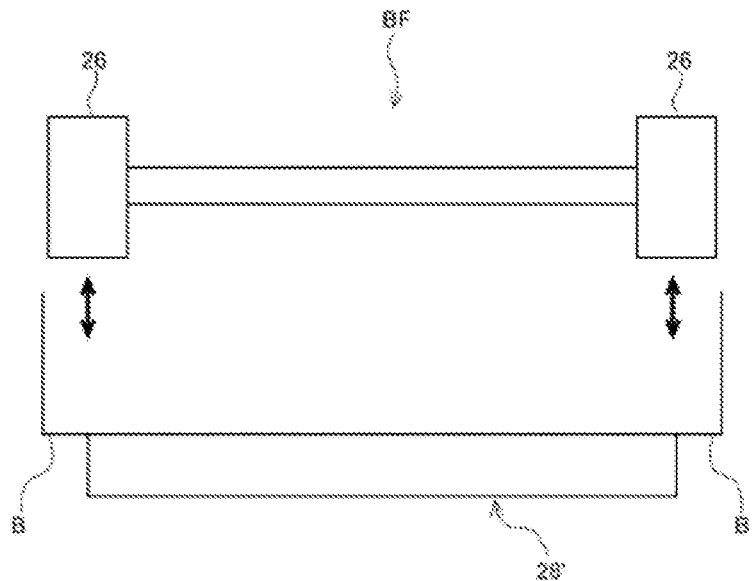

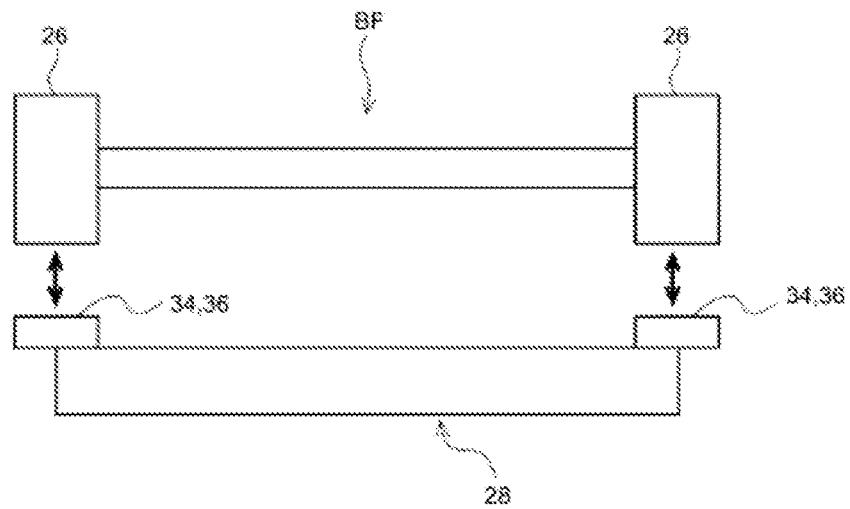
[Fig. 5]

[Fig. 6]
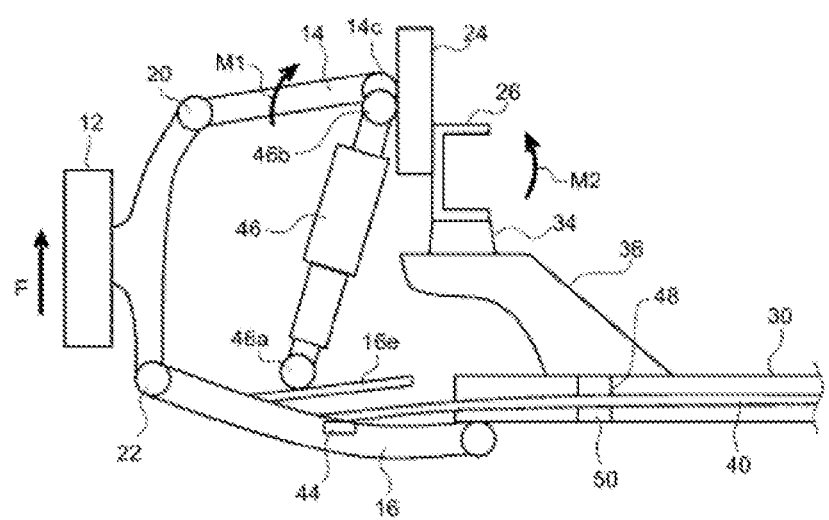

[Fig. 7]
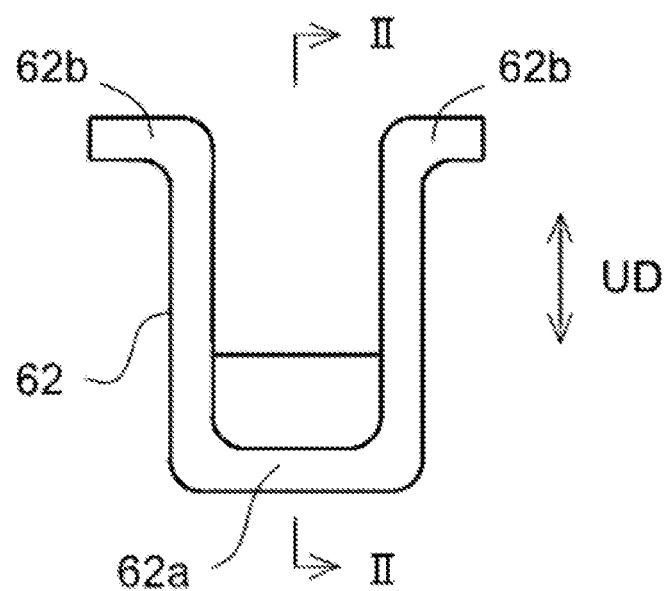

though there is a demand for weight reduction in order to maintain or improve driving performances such as wheel steering.

SUSPENSION DEVICE

CROSS-REFERENCE TO RELATED APPLICATIONS

This application is a U.S. National Stage entry of PCT Application No: PCT/JP2018/044872 filed Dec. 6, 2018, which claims priority to Japanese Patent Application No. 2017-236358 filed Dec. 8, 2017, the contents of which are incorporated herein by reference.

TECHNICAL FIELD

The present disclosure relates to a suspension device of an independent suspension type for a vehicle.

BACKGROUND ART

In a vehicle, a suspension device of a double wishbone type which is one of independent suspension types of wheels has been used in the related art. This kind of suspension device includes an upper arm that is swingably supported, by a side member of a vehicle body frame, around a support shaft, and a lower arm that is swingably supported, by a suspension cross member on the vehicle body side, around a support shaft. The upper arm and the lower arm are coupled to a knuckle of a wheel.

Patent Literature 1 discloses an example of such a suspension device. The suspension device of Patent Literature 1 includes the upper arm and the lower arm which are coupled to a knuckle via ball joints. Further, the suspension device includes a coil spring provided between the lower arm and a spring receiver fixed to the vehicle body frame, a shock absorber extending to a center of the coil spring, and a leaf spring disposed laterally in a vehicle width direction and having both ends coupled to corresponding lower arms. For example, in this suspension device, a bracket that connects the suspension cross member and the side member is provided to cover a periphery of a coil spring extending around the shock absorber, and is integrated with a spring receiver.

CITATION LIST

Patent Literature

Patent Literature 1: JP-A-H7-112607

SUMMARY OF INVENTION

Technical Problem

It is now conceivable to carry out various improvements in the suspension device of Patent Literature 1. For example, it is conceivable to increase a degree of freedom in design by attempting to improve relationships between various constituent elements. However, even if such an improvement is achieved, the suspension device needs to have sufficient rigidity against an input (for example, vibration) from a wheel side. In particular, since a large load acts on a joint portion between a side member (extending in a front-rear direction of a vehicle) of a vehicle body frame and a suspension cross member (extending in a vehicle width direction) positioned below the side member, there is a demand for maintaining or increasing rigidity in a vicinity of the joint portion to a certain degree or more. On the other The present disclosure provides a suspension device aimed at both high rigidity and weight reduction in a vicinity of a joint portion between a side member and a suspension cross member.

Solution to Problem

A suspension device of the present disclosure includes: an upper arm that is provided to swingably support a knuckle of a wheel and is swingably supported by a side member extending in a vehicle front-rear direction; a lower arm that swingably supports the knuckle and is swingably supported by a suspension cross member extending in a vehicle width direction; and a leaf spring that is disposed to extend in the vehicle width direction and has an end portion disposed in the lower arm, in which an intermediate part of the leaf spring is accommodated in a main cross member of the suspension cross member, the main cross member of the suspension cross member connects to the side member via a hollow bracket, the hollow bracket includes a bracket shock absorber positioned to face the lower arm, and the hollow bracket includes a reinforcing portion facing the bracket shock absorber.

In the suspension device, a reinforcing rib may be arranged inside the hollow bracket as the reinforcing portion.

In the suspension device, a shock absorbing device may be arranged between the lower arm and the side member, and the upper arm and the shock absorbing device may be in a disconnected state with the hollow bracket.

Advantageous Effects of Invention

According to the suspension device of the above technology of the present disclosure, the weight reduction in a vicinity of a joint portion between a side member and a suspension cross member can be achieved, and the rigidity thereof can be maintained at a certain degree or more since the suspension device includes the above configuration.

BRIEF DESCRIPTION OF DRAWINGS

FIG. 1 is a configuration view of a suspension device according to an embodiment of a technology of the present disclosure, and is a view seen from a side of a vehicle.

FIG. 2 is a configuration view of the suspension device of FIG. 1 on one wheel side, and is a partial cross-sectional view.

FIG. 3 is a view illustrating a lower arm and a leaf spring of the suspension device of FIG. 1.

FIG. 4 is a diagram showing assembly of a suspension device in the background art.

FIG. 5 is a diagram showing assembly of the suspension device of FIG. 1.

FIG. 6 is a schematic diagram showing the suspension device of FIG. 2.

FIG. 7 shows a reinforcing rib as viewed from a direction of an arrow A1 in FIG. 2.

DESCRIPTION OF EMBODIMENTS

An embodiment of the present disclosure will be described below with reference to the accompanying drawings. The same components (or configurations) are denoted by the same reference numerals, and names and functions thereof are also the same. Therefore, detailed descriptions of the same components are not repeated.

FIG. 1 illustrates a schematic configuration of a part of a suspension device 10 according to an embodiment of a technology of the present disclosure. FIG. 2 illustrates a configuration of the suspension device 10 on one wheel side, and a part thereof is illustrated in cross section. The suspension device 10 is applied to a front wheel of a vehicle herein, and a reference numeral "12" of FIG. 2 denotes a hub that supports a left front wheel (not illustrated). FIG. 1 is a view of the suspension device 10 of FIG. 2 (excluding hubs and knuckles of the left front wheel) as viewed from a lateral side of the left front wheel. Since a right front wheel side (not illustrated) substantially has a configuration that is bilaterally symmetrical to configurations of FIGS. 1 and 2, a description thereof will be substantially omitted below. A vehicle width direction is a direction substantially perpendicular to a paper plane in FIG. 1 and is a direction substantially parallel to a paper plane in FIG. 2, and a vehicle front-rear direction is a direction substantially parallel to the paper plane in FIG. 1 and is a direction substantially perpendicular to the paper plane in FIG. 2.

The suspension device 10 is configured as a suspension device of an independent suspension type. The suspension device 10 includes an upper arm 14 having a substantial V-shape or a substantial A-shape in a plan view, and a lower arm 16 having a substantial V-shape or a substantial A-shape in a plan view. An upper part of a knuckle 18 of a wheel is pivotally supported, that is, swingably supported via a ball joint 20 by the upper arm 14, particularly by an end portion (base portion) 14a, on an outer side in the vehicle width direction, of the upper arm 14. Also, a lower part of the knuckle 18 of the wheel is swingably supported via a ball joint 22 by the lower arm 16, particularly by an end portion (base portion) 16a, on an outer side in the vehicle width direction, of the lower arm 16.

An arm end portion 14c of each of two arm portions 14b, which are bifurcated inward in the vehicle width direction from the base portion 14a of the upper arm 14, is coupled to an upper arm bracket 25a of a bracket 24. As a result, the upper arm 14 is swingably supported around a support shaft of the bracket 25a. The bracket 24 is fixed to a side member 26 that is disposed to extend in the vehicle front-rear direction. The side member 26 is a component of a vehicle body frame BF (not illustrated in its entirety), and is disposed on both sides of the vehicle. Additionally, in the suspension device 10, as illustrated in FIG. 1, the bracket 24 is fixed to the side member 26 by five bolts B arranged in a W-shape. However, the number, arrangement, and the like of the bolts for fixing the bracket 24 are not limited to this example.

A suspension cross member (suspension cross member) 28 is disposed, in the vehicle width direction, on a vertically lower side of, that is, below the left and right side members 26 (FIGS. 1 and 2 illustrate only the side member 26 on the left of the vehicle) of the vehicle body frame BF. The suspension cross member 28 has a certain width in the vehicle front-rear direction, and includes a plurality of members extending in the vehicle width direction and a plurality of members extending in the vehicle front-rear direction so as to connect the members extending in the vehicle width direction. Specifically, the suspension cross member 28 includes a main cross member 30 extending in the vehicle width direction, a sub cross member 32 extending in the vehicle width direction, and a vertical member 34 extending in the vehicle front-rear direction. Here, the sub cross member 32 is disposed substantially parallel to the main cross member 30 at a distance from the main cross member 30 on a vehicle front side of the main cross member 30. Then, a vertical member 34 is provided across the main cross member 30 and the sub cross member 32. Here, constituent elements of the suspension cross member are generally formed of steel materials and are integrated by welding, but the materials and joining methods are not limited to this example. In addition, as for such a configuration of the suspension cross member 28, a configuration that the suspension cross member only includes a main cross member is not excluded in the present disclosure. As illustrated in FIGS. 1 and 2, in the suspension device 10, the vertical member 34 comes into contact with the side member 26 when the suspension cross member 28 is attached and fixed to the side member 26. In addition, the main cross member 30 and the sub cross member 32 support a steering gear box SU therebetween.

More specifically, the main cross member 30 is attached to the vertical member 34 via a bracket 36. The bracket 36 is attached to an upper portion of the main cross member 30 of the suspension cross member 28. The bracket 36 is provided to cover the main cross member 30 from above as illustrated in FIG. 1, and is provided on an upper portion of an end portion (in vehicle width direction) of the main cross member 30 as illustrated in FIG. 2. Note that the bracket 36 is attached and fixed to the main cross member 30 by welding, which is not illustrated, and the bracket 36 may be fixed to the main cross member 30 by mechanical joining means such as bolts. As illustrated in FIGS. 1 and 2, the vertical member 34 is disposed to straddle an upper portion of the bracket 36. In this way, in the suspension device 10, the bracket 36 is incorporated inside the suspension cross member 28. However, the bracket 36 may be attached to an outside of the suspension cross member 28 (that is, the suspension cross member 28 may be attached to the side member 26 via the bracket 36). Additionally, in any of these examples, the suspension cross member 28 is connected to the vertically lower side of the vehicle body frame BF (side member 26), and at this time, the suspension cross member 28 includes the bracket 36 therein or thereabove. Hereinafter, in order to distinguish the bracket 36 from the bracket 24, the bracket 24 is referred to as an upper bracket, and the bracket 36 is referred to as a lower bracket.

The sub cross member 32 is also attached to the vertical member 34 via a support bracket 33. A lower end portion of the support bracket 33, which extends in a substantially vertical direction (substantially vertical direction), is joined to each of two end portions, in vehicle width direction, of the sub cross member 32 so as to cover the sub cross member 32 from above. Then, an upper end portion of the support bracket 33, which is joined to the sub cross member 32 in this manner, is joined to the vertical member 34, so that the sub cross member 32 is attached to the vertical member 34.

The suspension cross member 28 further includes lower arm brackets 38. Arm end portions 16c of two arm portions 16b, which are bifurcated inward in the vehicle width direction from the base portion 16a of the lower arm 16, are coupled to the lower arm brackets 38. As a result, the lower arm 16 is swingably supported around a support shaft of the bracket 38. Here, as illustrated in FIG. 1, the lower arm brackets 38 is provided to sandwich the main cross member 30 in the vehicle front-rear direction. Here, the lower arm bracket 38 on a vehicle front side is also configured as the support bracket 33 joined to an end portion, on an outer side in the vehicle width direction, of the sub cross member 32. Therefore, the lower arm bracket 38 on the vehicle front side serves as the support bracket 33. The lower arm bracket 38 on a vehicle rear side is coupled to an extension portion 30E of the main cross member 30. Further, an upper end portion of the lower arm bracket 38 is attached and fixed to the vertical member 34. In this way, the lower arm 16 is not directly connected to the lower bracket 36, and the lower bracket 36 is separated from the lower arm 16.

In the suspension device 10, a leaf spring 40 is disposed horizontally so as to extend in the vehicle width direction. The leaf spring 40 is disposed through an inner cavity 30s of the main cross member 30 of the suspension cross member 28. Then, one end portion 40a of the leaf spring 40 is disposed on a support portion 44 of the lower arm 16 on a left front wheel side (the hub 12 side in FIG. 2) as described below, and the other end portion of the leaf spring 40 is similarly disposed on a support portion 44 of the lower arm 16 on a right front wheel side (not illustrated).

The support portion 44 is formed on a vertically upper side of, that is, above a substantial triangular region formed between the base portion 16a of the lower arm 16 and the arm portion 16b extending in the bifurcated manner from the base portion 16a, such that the support portion 44 is substantially horizontal in the vehicle. The leaf spring 40 has a shape that generally extends in the vehicle width direction and is curved to slightly protrude upward in the vertical direction. An intermediate part 40b of the leaf spring 40 is accommodated in the suspension cross member 28. More specifically, the intermediate part 40b is accommodated in the main cross member 30 of the suspension cross member 28, and is supported, by a bushing member 47, with respect to the main cross member 30. More specifically, the intermediate part 40b of the leaf spring 40 is supported, with respect to the main cross member 30, by the bushing member 47 on the left front wheel side (an upper bushing 48 and a lower bushing 50), and a bushing member (not illustrated) on the right front wheel side (an upper bushing and a lower bushing). The bushing member 47 includes the upper bushing 48 that is positioned on a vertically upper side of the leaf spring 40 and connected to an inner surface of the main cross member 30, and the lower bushing 50 that is positioned on a vertically lower side of the leaf spring 40 and connected to an inner surface of the main cross member 30. The leaf spring 40 is provided in a manner to be pressed against the support portion 44 of the lower arm 16 by the upper bushing 48. The upper bushing 48 corresponds to a transmission portion which can transmit a force from the leaf spring 40 to the suspension cross member 28. Also, the lower bushing 50 is provided to support the leaf spring 40 in a manner that allows the leaf spring 40 to play various roles or realize various functions, for example, allows the leaf spring 40 to serve as a stabilizer. When the lower bushing 50 is provided as well, the leaf spring 40 can be curved in a substantial S-shape and can act on both the left and right front wheels when different forces are generated at the left and right front wheels, for example, when the left front wheel is lifted upward, while the right front wheel is lowered downward.

As illustrated in FIG. 3, the lower arm 16 includes the support portion 44, and a lower arm cover portion 16e provided to cover a vertically upper side of the support portion 44. Note that in order to be distinguished from the cover portion 16e, a main body portion 16d, which includes the base portion 16a and the arm portions 16b extending from the base portion 16a in the bifurcated manner described above, may also be referred to as a lower arm main body portion.

In the lower arm 16, the lower arm main body portion 16d is provided with the support portion 44 for supporting the end portions of the leaf spring 40. The support portion 44 is provided to be placed in the lower arm 16, and provided to be able to be detached or replaced with respect to the lower arm 16. Similar to the lower arm 16, the support portion 44 is formed of a steel material out of the metal materials. An elastic body 44a is provided below the support portion 44. The elastic body 44a is provided to improve a shock absorbing ability when a large force acts on the support portion 44 and absorb a difference between a rotation trajectory of the lower arm 16 and a rotation trajectory of the leaf spring 40. Then, the lower arm 16, in which the cover portion 16e is attached to the lower arm main body portion 16d, includes an opening portion 16f that opens inward in the vehicle width direction. The leaf spring 40 extends into a space in the lower arm 16 through the opening portion 16f, and the end portion of the leaf spring 40 is supported by the support portion 44 of the lower arm 16. In this way, although the lower arm 16 has a space, the cover portion 16e has a predetermined reinforcing shape so that the lower arm 16 has strength or rigidity equal to or greater than a predetermined level. Specifically, the opening portion 16f of the cover portion 16e of the lower arm 16 has a substantial arch shape (substantial U-shape). In FIGS. 1 and 2, the leaf spring 40 is separated from an inner surface of the cover portion 16e.

A shock absorber 46, which is a shock absorbing device, is disposed between the lower arm 16 and the side member 26 in the above configuration. One end portion 46a of the shock absorber 46 is connected to the lower arm 16. A connection portion 16g of the lower arm 16 to the shock absorber 46 is provided on an outer surface on a vertically upper side of the cover portion 16e of the lower arm 16, and is positioned substantially above a vicinity of the base portion 16a of the lower arm 16. The other end portion 46b of the shock absorber 46 is coupled to a connection portion 25b, between two upper arm brackets 25a, of the upper bracket 24.

Well, in the suspension device 10 having the above configuration, as is apparent from the above descriptions and drawings, the upper bracket 24, which is connected to an outer side of the side member 26 in the vehicle width direction, is independent of and separated from the suspension cross member 28 connected to the vertically lower side of the side member 26. In contrast, in a suspension device in related art, a bracket connecting the suspension cross member and the side member extends to the outer side of the side member 26 in the vehicle width direction. For example, in a suspension device of Patent Literature 1, as described above, a bracket connecting the suspension cross member to the side member is provided to cover a periphery of a coil spring around which the shock absorber extends to the center, and is integrated with a receiver of the spring. Therefore, in the suspension device of Patent Literature 1, a design relationship between constituent members is very strong. Since the suspension device 10 has the above configuration, the suspension device 10 has a high degree of freedom in design as compared with the suspension device according to the related art. Further, the upper bracket 24 (with which the upper arm 14 and the shock absorber are in a connected state) is independent of the lower bracket 36 (with which the upper arm 14 and the shock absorber are in a disconnected state) which is provided to cover the end portion of the main cross member 30 from above and is positioned on the vertically lower side of, that is, below the side member 26. As a result, the upper arm 14 and the shock absorber 46, which are connected to the upper bracket 24, are not directly connected to the lower bracket 36, that is, in a disconnected state. Therefore, the suspension device 10 has a higher degree of freedom in design. In this way, the suspension device 10 has a configuration in which the upper bracket 24 and the lower bracket 36 are independent of each other.

Since the suspension device 10 has a configuration in which the upper bracket 24 and the lower bracket 36 are independent of each other, the suspension device 10 is excellent in the assemblability of the vehicle body frame BF. Here, a suspension device according to the related art will be described first. FIG. 4 schematically shows a vehicle body frame BF including left and right side members 26, and a suspension cross member 28' including brackets B having a substantially L-shaped cross section as the bracket described in Patent Literature 1. As can be seen from FIG. 4, in the suspension device according to the related art, when the suspension cross member 28' including the brackets B is assembled with the vehicle body frame BF, precise positioning, between the suspension cross member 28' and the vehicle body frame BF, in the front, the rear, the left, and the right, and a horizontal direction is required.

In contrast, in the suspension device 10 according to the present embodiment, the upper bracket 24 and the lower bracket 36 (that is, the suspension cross member 28) are separated from and independent of each other as described above. That is, the upper bracket 24 is not fixed to the suspension cross member 28 and is independent of and separated from the suspension cross member 28. Then, with this configuration, the upper bracket 24 may be attached to the side member 26 separately from the suspension cross member, and the suspension cross member 28 including the lower bracket 36 may be attached to the side member 26 separately from the upper bracket 24. The upper arm 14 and the shock absorber 46 are attached to the upper bracket 24. Then, the suspension cross member 28 including the lower bracket 36 is assembled. Although the upper bracket 24 and the suspension cross member 28 are coupled via the shock absorber 46 and the lower arm 16, positions of the shock absorber 46 and the lower arm 16 between the upper bracket 24 and the suspension cross member 28 are not determined fixedly. This would be readily understood from the fact that the lower arm 16 is swingably attached to the suspension cross member 28 and the end portion 46a of the shock absorber 46 is rotatable (swingable) around a support shaft. Therefore, as schematically shown in FIG. 5, when the suspension cross member 28 is attached to the vehicle body frame BF, rough positioning is performed, between the suspension cross member 28 and the vehicle body frame BF, in the front, the rear, the left, and the right, and a horizontal direction without a need for the precise positioning in the suspension device according to the related art, so that the suspension cross member 28 and the vehicle body frame BF are in contact with each other, and thereafter the positional relationship can be finely adjusted. Then, in a state where the suspension cross member 28 is fixed to the vehicle body frame BF (in particular, the side member 26) together with the lower bracket 36, the upper bracket 24 can be firmly fixed to the side member 26. In this way, when the above configuration is adopted in which the upper bracket 24 and the lower bracket 36 (that is, the suspension cross member 28) are independent of and separated from each other, it is possible to improve expectedly the assemblability of the constituent elements, particularly the suspension cross member 28, to the vehicle body frame BF (mainly the side member 26) in the suspension device 10.

Further, the suspension device 10 is excellent in the strength or the rigidity as described below with reference to FIGS. 2 and 6. FIG. 6 is a schematic diagram of the suspension device 10 in FIG. 2.

First, as described above, one end portion 46a of the shock absorber 46 is connected to the lower arm 16, and the other end portion 46b of the shock absorber 46 is connected to the upper bracket 24. In the vehicle width direction, the connection portion of the shock absorber 46 to the lower arm 16 is outside the upper bracket 24. Then, the upper bracket 24 is connected to the side member 26 from an outer side in the vehicle width direction. Therefore, the shock absorber 46 can exert a force to the side member 26 from outside to inside of the vehicle in the vehicle width direction. In this way, a first transmission route of the force from the outside in the vehicle width direction to the side member 26 is formed.

Then, a second transmission route of a force, which is different from the first transmission route of the force from the outside in the vehicle width direction to the side member 26, is formed on the vertically lower side of the side member 26. In the second transmission route, the upper bushing 48 and the lower bracket 36 that is independent of the upper bracket 24 exist. In the second transmission route, the force from the leaf spring 40 can be applied to the side member via the upper bushing 48, the main cross member 30, the lower bracket 36, and the vertical member 34 in this order.

In the above-mentioned suspension device 10, for example, when a force F to lift the hub 12 upward in the vertical direction acts on the wheel, a moment M1 from the outside of the vehicle to the inside of the vehicle as schematically shown in FIG. 6 may act on the side member 26 via the lower arm 16 and the shock absorber 46 in the first transmission route. On the other hand, when the force F acts on the wheel (the hub 12), a force is transmitted from the lower arm 16 to the leaf spring 40, and then a force from the leaf spring, that is, an elastic force, is transmitted to the main cross member 30 via the upper bushing 48. As a result, since the lower bracket 36 (independent of the upper bracket) is disposed on the vertically lower side of the side member 26, a moment M2 from the inside of the vehicle to the outside of the vehicle as schematically shown in FIG. 6 can act on the side member 26. As can be seen from FIG. 6, these moments M1 and M2 are forces in directions in which the moments M1 and M2 cancel each other out. That is, when the force F acts on the wheel (the hub 12), only a moment corresponding to the moment M1 acts on the side member 26 in the suspension device of Patent Literature 1, whereas the moments M1 and M2 in directions in which the moments M1 and M2 cancel each other out can act on the side member 26 in the suspension device 10 of the present embodiment. Therefore, the suspension device 10 of the present embodiment does not require a structural change accompanied by weight increase, for example, due to increasing a thickness of the side member, and is excellent in the rigidity with respect to the force F.

In the suspension device 10, the lower bracket 36 substantially has a connection region with the main cross member 30 on the inner side of the vehicle relative to the side member 26 in the vehicle width direction (see FIGS. 2 and 6). The connection region extends to the vertically upper side of the upper bushing 48 (which is located more inward than the side member 26 in the vehicle width direction). Therefore, as shown in FIGS. 2 and 6, the lower bracket 36 is formed such that a vertically upper part of the lower bracket 36 is positioned more outward than a vertically lower part thereof in the vehicle width direction. Therefore, when the force F acts on the wheel, the lower bracket 36 can apply an upward force, which is transmitted from the leaf spring 40 via the main cross member 30, to the side member 26 more suitably, whereby the moment M2 can be generated. In this way, the lower bracket 36 may function as a force transmission member that transmits a force between the leaf spring 40 and the side member 26 via the main cross member 30, the upper bushing 48, or the like.

The suspension device 10 further includes a configuration aimed at both high rigidity and weight reduction around a joint portion between the side member 26 and the suspension cross member 28. This will be described below with reference to FIGS. 1 to 3.

The lower bracket 36 (with which the upper arm 14 and the shock absorber 46 are in the disconnected state, as is apparent from the above description or the like) is provided in a vicinity of a joint portion between the side member 26 and the suspension cross member 28. As is apparent from FIG. 2, the lower bracket is generally hollow in the suspension device 10. That is, the lower bracket corresponds to a hollow bracket in the technology of the present disclosure. In this way, since the lower bracket 36, which occupies a certain degree of space in the vicinity of the joint portion between the side member 26 and the suspension cross member 28, is formed to be hollow, the suspension device 10 is excellent in the weight reduction.

On the other hand, in response to the fact that the lower bracket 36 is formed to be hollow, the lower bracket includes a reinforcing portion 60. A reinforcing rib 62 is arranged in the lower bracket 36 as the reinforcing portion 60. The reinforcing rib 62 viewed from a direction of an arrow A1 in FIG. 2 is shown in FIG. 7. A cross section of the reinforcing rib 62 taken along a line II-II of FIG. 7 is shown in FIG. 2. The reinforcing rib 62 has a so-called hat shape, and includes a top portion 62*a* of a main body portion having a substantially U-shaped cross section, and projecting portions (flange portions) 62*b* that project outward on a side opposite to the top portion 62*a* of the main body portion. The top portion 62*a* is substantially parallel to the projecting portions 62*b*. The reinforcing rib 62 having such a configuration is excellent in the strength in a vertical direction UD in FIG. 7. Note that the vertical direction UD generally corresponds to a transmission direction of the force in the second transmission route of the force described above. Additionally, the lower bracket 36 includes an outer case member 36*a* and an inner case member 36*b*, and the reinforcing rib 62 is fixed between the case members 36*a* and 36*b*. Here, the outer case member 36*a*, the inner case member 36*b*, and the reinforcing rib 62 are integrated by welding, and may be integrated by other joining means (for example, mechanical joining means such as bolts).

The lower bracket 36 further includes a bump rubber 64 as a bracket shock absorber (shock absorbing portion) positioned to face the lower arm 16. That is, the bump rubber 64 is provided at a position facing the lower arm 16 in the lower bracket 36. The bump rubber 64 protrudes from the lower bracket 36. The bump rubber 64 is formed of a rubber material, and can be formed of various cushioning materials.

Then, a part 16*u* with which the bump rubber 64 can collide (hereinafter, referred to as a receiving portion) is formed or defined at a position facing the bump rubber 64 in the lower arm 16. Here, as is apparent from FIG. 2, since an upper surface of the lower arm 16, more specifically, an upper surface of the cover portion 16*e* of the lower arm 16 faces the bump rubber 64, the receiving portion 16*u* of the lower arm 16 serves as a thick portion and is formed on the upper surface of the cover portion 16*e*. Note that when a force that compresses the shock absorber 46 in an axial direction thereof is applied, the bump rubber 64 may come into contact with the receiving portion 16*u* of the lower arm 16 by collisions or the like. Since the receiving portion 16*u* is formed on the cover portion 16*e* having a predetermined reinforcing shape, the lower arm 16 can sufficiently withstand the collisions or the like.

In contrast, since the reinforcing rib 62 described above is provided in the hollow lower bracket 36, the lower bracket 36 is also excellent in the strength or the rigidity. In particular, in the suspension device 10, the reinforcing rib 62 is disposed as follows so as to effectively maintain the strength or the rigidity between the bump rubber 64 and the side member 26. Specifically, the reinforcing rib 62 is provided behind the bump rubber 64, that is, on the lower bracket 36 side (the side member 26 side). In other words, the reinforcing rib 62 is provided on the lower bracket 36 so as to face the bump rubber 64. The top portion 62*a* of the reinforcing rib 62 is positioned behind the bump rubber 64 with the inner case member 36*b* interposed therebetween. As is apparent from FIGS. 2 and 7, the reinforcing rib 62 is disposed such that the projecting portions 62*b* on the side opposite to the top portion 62*a* of the reinforcing rib 62 extend to the lower side of the vertical member 34 which is provided to straddle the outer case member 36*a* of the lower bracket 36. Therefore, when the bump rubber 64 provided on the lower bracket 36 collides with the receiving portion 16*u* of the lower arm 16, the shock can be absorbed by the bump rubber 64 itself, and the rigidity in the vicinity of the joint portion between the side member 26 and the suspension cross member 28 can be maintained at a certain degree or more by the existence of the reinforcing rib 62.

The present disclosure is not limited to the above-described embodiment, and may be appropriately modified and implemented without departing from the scope of the present disclosure.

For example, in the above embodiment, a hat type reinforcing rib 62 is disposed as the reinforcing portion 60. However, the reinforcing portion 60 may have a configuration other than the reinforcing rib 62. For example, at least one rod-shaped member may be disposed in the lower bracket 36 as the reinforcing portion 60 so as to extend in a transmission direction of a force in the second transmission route.

For example, in the above embodiment, the upper arm and the shock absorber are connected to a single upper bracket 24. However, the upper bracket 24 is not limited to being a single member, and may include two or more members. For example, the upper bracket 24 may include two separated upper arm brackets for connecting the upper arm, and a bracket for connecting the shock absorber, which is provided between the two separated upper arm brackets. These three brackets may be completely separate and independent, and are preferably integrally formed or integrated together.

Note that each constituent element of the technology of the present disclosure may be formed of various materials (which are not limited to being formed of a material as described above). For example, the support portion 44 is not limited to being formed of a steel material, and may be formed of other materials such as a non-ferrous metal material and a resin material. The support portion 44 may be formed of a material different from that of the lower arm.

The technology of the present disclosure is not limited to being applied to a front wheel of a vehicle, and may be applied to a rear wheel.

This application is based on a Japanese Patent Application (Japanese Patent Application No. 2017-236358), filed on Dec. 8, 2017, the contents of which are incorporated herein by reference.

INDUSTRIAL APPLICABILITY

According to the suspension device of the above technology of the present disclosure, the weight reduction in the vicinity of the joint portion between the side member and the suspension cross member can be achieved, and the rigidity thereof can be maintained at a certain degree or more since the suspension device includes the above configuration.

REFERENCE SIGNS LIST

10 Suspension device
14 Upper arm
16 Lower arm
16u Receiving portion
18 Knuckle
24 Upper bracket
26 Side member
28 Suspension cross member
30 Main cross member
32 Sub cross member
34 Vertical member
36 Lower bracket (hollow bracket)
40 Leaf spring
46 Shock absorber
47 Bushing member
48 Upper bushing
50 Lower bushing
62 Reinforcing rib (reinforcing portion)
64 Bump rubber (bracket shock absorber)

The invention claimed is:
1. A suspension device comprising:
an upper arm that is configured to swingably support a knuckle of a wheel and configured to be swingably supported by a side member extending in a vehicle front-rear direction;
a lower arm that is provided to swingably support the knuckle and configured to be swingably supported by a suspension cross member extending in a vehicle width direction; and
a leaf spring that is disposed to extend in the vehicle width direction and has an end portion disposed in the lower arm,
wherein an intermediate part of the leaf spring is accommodated in a main cross member of the suspension cross member,
the main cross member of the suspension cross member connects to the side member via a hollow bracket,
the hollow bracket includes a bracket shock absorber positioned to face the lower arm,
the hollow bracket includes a reinforcing portion facing the bracket shock absorber,
the hollow bracket includes an outer case member and an inner case member, and
each of the outer case member and the inner case member has a connection region with the main cross member on a vertically upper side of the main cross member.
2. The suspension device according to claim 1,
wherein a reinforcing rib is arranged inside the hollow bracket as the reinforcing portion.
3. The suspension device according to claim 2,
wherein a shock absorbing device is arranged between the lower arm and the side member, and
the upper arm and the shock absorbing device are in a disconnected state with the hollow bracket.
4. The suspension device according to claim 1,
wherein a shock absorbing device is disposed between the lower arm and the side member, and
the upper arm and the shock absorbing device are in a disconnected state with the hollow bracket.

* * * * *